(12) United States Patent
Hua et al.

(10) Patent No.: US 9,919,390 B2
(45) Date of Patent: Mar. 20, 2018

(54) COMBINED RING ROLLING METHOD FOR SPHERICAL VALVE BODY

(71) Applicant: WUHAN UNIVERSITY OF TECHNOLOGY, Wuhan, Hubei (CN)

(72) Inventors: Lin Hua, Hubei (CN); Dongsheng Qian, Hubei (CN); Jiadong Deng, Hubei (CN); Xiaokai Wang, Hubei (CN)

(73) Assignee: WUHAN UNIVERISTY OF TECHNOLOGY, Wuhan, Hubei (CN)

( * ) Notice: Subject to any disclaimer, the term of this patent is extended or adjusted under 35 U.S.C. 154(b) by 360 days.

(21) Appl. No.: 14/859,160

(22) Filed: Sep. 18, 2015

(65) Prior Publication Data

US 2016/0082553 A1    Mar. 24, 2016

(30) Foreign Application Priority Data

Sep. 24, 2014    (CN) .......................... 2014 1 0494443

(51) Int. Cl.
| | |
|---|---|
| *B23P 15/00* | (2006.01) |
| *B21H 7/00* | (2006.01) |
| *B21H 1/06* | (2006.01) |
| *B21H 1/12* | (2006.01) |

(52) U.S. Cl.
CPC .............. *B23P 15/001* (2013.01); *B21H 1/06* (2013.01); *B21H 7/00* (2013.01); *B21H 1/12* (2013.01); *Y10T 29/49405* (2015.01)

(58) Field of Classification Search
CPC ........... B23P 15/001; B21H 1/06; B21H 1/12; B21H 7/00; Y10T 29/49405

USPC .................................................... 72/105–107
See application file for complete search history.

(56) References Cited

U.S. PATENT DOCUMENTS

| | | | | |
|---|---|---|---|---|
| 6,038,758 A | * | 3/2000 | Kanai ....................... | B21H 1/06 29/557 |
| 6,978,546 B2 | * | 12/2005 | Andersson ................ | B21H 1/12 29/898.06 |
| 8,689,597 B2 | * | 4/2014 | Hirose ....................... | B21B 5/00 72/101 |
| 2016/0339504 A1 | * | 11/2016 | Breton ....................... | B21H 1/06 |
| 2017/0008066 A1 | * | 1/2017 | Maritz ....................... | B21H 1/06 |

* cited by examiner

*Primary Examiner* — Sarang Afzali
(74) *Attorney, Agent, or Firm* — Tim Tingkang Xia, Esq.; Locke Lord LLP (57) ABSTRACT

This invention relates to a combined ring rolling method for spherical valve body, which has the following procedures: 1) design for ring blank by computing ring blank volume and selecting reasonable rolling ratio according to the dimensions of forged ring; 2) design for rolling gap which includes the shapes and dimensions of working surfaces of main roll, mandrel and passive rolls according to the dimensions of ring blank and forged ring, the stable deformation condition of combined ring rolling and structure requirement of rolling equipment; 3) rolling forming with three stages of surface cross rolling, ring rolling and shaping by controlling of feeding speed of main roll and working positions of passive rolls. This invention has the technical economical advantages of low consumptions of energy and materials, high productivity and low production cost.

3 Claims, 3 Drawing Sheets

COMBINED RING ROLLING METHOD FOR SPHERICAL VALVE BODY

CROSS-REFERENCE TO RELATED APPLICATION

This application claims priority under 35 U.S.C. § 119(a) to Chinese Patent Application No. CN201410494443.0, filed Sep. 24, 2014, in the State Intellectual Property Office of P.R. China, which is hereby incorporated herein in its entirety by reference.

BACKGROUND OF THE INVENTION

Field of Invention

The present invention relates to mechanical equipment manufacturing filed, specifically refers to the a combined ring rolling method for spherical valve body.

Description of the Related Art

Spherical valve is one kind of typical valve parts, which has extensive application in energy industry such as petroleum, natural gas, electric power, etc., and is very important for the safety and reliability of energy equipments. Valve body is the key component of spherical valve, which has spherical exterior surface and circular through-hole, is a kind of complex ring part with spherical profile. Because of the extreme working condition and high-performance requirement of spherical valve, the valve body usually needs plastic working to ensure its mechanical property. At present, spherical valve body used to be formed by conventional forging method: the ring blank forging with press machine is firstly carried out, then the rimming and profile shaping of ring blank is performed using spherical die and mandrel. This technology normally needs repeated heating and forging, leads to the high energy consumption, low efficiency and high labor intensity, furthermore, the poor forming accuracy and surface quality will expend a great amount of machining time and materials, thus the production cost increases significantly. The ring rolling technology is also considered for spherical valve body forming, however, as the ring has the features of profile cross-section and small rolling ratio, it was found that the profile shaping and diameter expanding are nonsynchronous during the ring rolling process, which leads to the profile cannot be shaped completely when the ring diameter reaches to the required dimension. So, in ring rolling for spherical valve body, the performing of ring blank under press machine is needed to avoid this defect, which increases the workstage and operating complexity thus also causes the much consumption of energy and time.

SUMMARY OF THE INVENTION

Aiming at above-mentioned manufacturing status of spherical valve body, the motivation of this invention is to provide a combined ring rolling method for spherical valve body. Using this new method with reasonable technological design and process control, the valve body can be formed once by continuous partial plastic deformation and obtained the complete spherical profile, thus can significantly reduce the energy consumption, increase the material utilization and working efficiency and decrease the production cost.

In order to achieve the above purpose, the present invention provides a combined ring rolling method for spherical valve body. It is characterized in that the method comprises the steps as follows:

1) Design for Ring Blank

The ring blank section is designed to rectangular section. And its size can be designed as following steps:

(1) Determining Ring Blank Volume

Firstly, the forged ring volume V can be calculated as following equation $$V = \pi B R_s^2 - \pi \frac{B^3}{12} - \pi B r^2$$

where $R_s$, B and r are respectively the spherical radius, height and inner radius of the forged ring. And r is the half value of the forged ring inner diameter d.

According to the principle of volume keeping constant during plastic deformation, and considering the metallic oxidation loss during ring blank heating (the loss coefficient α is usually 3%~5%), thus the ring blank volume $V_0$ can be designed as $V_0=(1+\alpha)V$.

(2) Determining Rolling Ratio

The rolling ratio k is the section area ratio of forged ring to ring blank, that is $k=s_0/s$, where $s_0$ is the section area of ring blank and s is the section area of forged ring.

The ring blank section area $s_0$ can be calculated as $s_0=(R_0-r_0)B_0$, where $R_0$, $B_0$ and $r_0$ are respectively the outer radius, height and inner radius of the blank. And $R_0$ is the half value of the ring blank outer diameter $D_0$, $r_0$ is the half value of the ring blank inner diameter $d_0$.

The forged ring section area s can be calculated as $$s = R_s^2 \arcsin\frac{B}{2R_s} - 0.5B\sqrt{R_s^2 - 0.25B^2} + B\left(\sqrt{R_s^2 - 0.25B^2} - r\right)$$

The rolling ratio can reflect the rolling deformation degree and rolling efficiency. In order to make the ring blank produce sufficient deformation to refine microstructure, and considering to enhance rolling efficiency, the valve of k is usually 1.2~3.

(3) Determining Ring Blank Size

Due to adopt closed cavity, the axial deformation is very small. Therefore, the ring blank height is designed equal to the forged ring height, that is $B_0=B$.

According to the ring blank volume, height and rolling ratio, the ring blank inner radius can be designed as $$r_0 = \frac{V_0}{2\pi k s} - \frac{ks}{2B_0}$$

And the ring blank outer radius can be designed as $$R_0 = \frac{V_0}{2\pi k s} + \frac{ks}{2B_0}$$

2) Design for Rolling Gap

In this invention, the combined ring rolling includes two stages, that is surface cross rolling and general ring rolling. During the surface cross rolling stage, the rolling gap is made up of the working surfaces of main roll and two passive rolls. During the general ring rolling stage, the rolling gap is made up of the working surfaces of main roll and mandrel.

The working surfaces of main roll, mandrel and two passive rolls can be designed as following method:

(1) Working Surface of Main Roll

The working surface of main roll is adopted closed structure. And the main working surface is spherical surface.

The spherical radius of main roll $R_{sm}$ is design as $R_{sm}=R_s$.

The working surface height of main roll $B_m$ is design as $B_m=B+(1\sim4)$ mm.

To make rolling process stabilization, the linear velocity of main roll $v_m$ is usually $(1.0\sim1.2)$ m/s. According to the linear velocity of main roll, the maximum working surface radius of main roll can be determined as $$R_{m2} = \frac{v_m}{2\pi n_m}$$

where $n_m$ is the rotational speed of main roll, and it can be calculated by the equation $$n_m = \frac{n}{\eta}$$

where n is rotational speed of motor, $\eta$ is the transmission ratio.

(Additional remark: $\eta$ is the transmission ratio of gearbox. For any given gearbox, $\eta$ is a known value. When gearbox is not given, $\eta$ can be determined to make sure $v_m$ is in the range of $(1.0\sim1.2)$ m/s)

The minimum working surface radius of main roll can be determined as $$R_{m1} = R_{m2} - \left(R_{sm} - \sqrt{R_{sm}^2 - \frac{B_m^2}{4}}\right)$$

There is a raised step respectively on the upper and lower working surface of main roll, which constitute the closed rolling gap. In order to prevent the main roll from contacting the mandrel during rolling process, the radial length of the step should smaller than the radial thickness of the upper and lower surface of the forged ring, that is $$L_{mu} < \sqrt{R_s^2 - \frac{B^2}{4}} - r$$

Generally, the radial length of the upper step on main roll $L_{mu}$ is determined as the following formula $$L_{mu} = (0.5 \sim 0.8)\left(\sqrt{R_s^2 - \frac{B^2}{4}} - r + R_0 - r_0\right)$$

The radial length of the lower step on main roll $L_{ml}$ is equal to $L_{mu}$. The axial height of the step on main roll can be determined as the following formula $$B_{mu}=B_{ml}=(0.1\sim0.3)B$$

where $B_{mu}$ and $B_{ml}$ are respectively the axial height of the upper and lower step on main roll.

(2) Working Surface of Mandrel

The axial working surface height of mandrel $B_i$ can be determined as the following formula $$B_i=B+(20\sim80) \text{mm}$$

To satisfy the critical condition of biting into rolling gap and plastic penetrating deformation zone, the working surface radius of mandrel should satisfy the following formula $$R_i \geq \frac{R_{m1}(R_0 - r_0)}{17.5\beta R_{m1} - (R_0 - r_0)}$$

where the frictional angle $\beta=\arctan\mu$, $\mu$ is the friction coefficient.

(Additional remark: $\mu$ is the friction coefficient, and its valve can be obtained by friction coefficient test or reference. For steel, the hot friction coefficient is about 0.35.)

Considering the mandrel passing through the ring blank inner hole, the working surface radius of mandrel should also satisfy the following formula $$R_i \leq r_0 - 10$$

During putting the ring blank in, taking the forged ring out and rolling process, the center distance of the main roll to the mandrel should in the limited closed center distance range of the equipment. Therefore, the size of the main roll and mandrel should also satisfy the formulas $$R_{m1} + R_{sm} - \sqrt{R_{sm}^2 - \frac{B_m^2}{4}} + L_{mu} + R_i + H_{max} < S_{max}$$

$$R_{m1} + R_{sm} - r + R_i > S_{min}$$

where $H_{max}$ is the bigger one between the ring blank maximum thickness and the forged ring maximum thickness. $S_{max}$ is the maximum closed center distance of the equipment and $S_{min}$ is the minimum closed center distance of the equipment.

(Additional remark: if $H_{bmax}$ is the maximum thickness of the ring blank and $H_{rmax}$ is the maximum thickness of the forged ring, $H_{max}$ is the bigger one between $H_{bmax}$ and $H_{rmax}$.

(3) Working Surface of Passive Roll

The structure of passive roll is similar to the main roll, the working surface of the passive roll is also spherical surface.

The spherical radius of passive roll $R_{sc}$ is design as $R_{sc}=R_s$.

The working surface height of main roll $B_c$ is design as $B_c=B_m+(1\sim4)$ mm.

The minimum working surface radius of passive $R_{c1}$ roll can be determined as $R_{c1}=(0.3\sim0.7) R_{m1}$.

For the characteristic of small thickness on the upper and lower region to this ring part, to effectively prevent the ring from producing axial spread, the axial height of the passive roll cavity is larger than the main roll. Generally, the radial length of the upper step $L_{cu}$ and the lower step $L_{cl}$ on the passive roll can be determined by $L_{cu}=L_{cl}=(1.5\sim3) L_{mu}$. The axial height of the upper step $B_{cu}$ and the lower step $B_{cl}$ on the passive roll can be determined by $B_{cu}=B_{cl}=(0.1\sim0.3)B$.

The two passive rolls are respectively arranged on the left and right sides below the mandrel. $\theta_1$ is the angel between the vertical and the line of the center points of left passive roll to the mandrel, and $\theta_2$ is the angel between the vertical and the line of the center points of right passive roll to the mandrel. Generally, their valve are in the range of $50°\sim70°$.

For the deformation characteristic of different stages, the arranged angels of the left and right passive rolls are usually different during rolling process. During the surface cross rolling stage, the two passive rolls are symmetrically arranged on the left and right sides of the mandrel. The values of $\theta_1$ and $\theta_2$ are both about 60°, which is good for force balance and stable rolling. During the general ring rolling stage, the arranged angel of the right passive roll $\theta_2$ is slightly larger than the left passive roll $\theta_1$. The value of $\theta_2$ is about 65°~70°, and the value of $\theta_1$ is 50°~55°. Thus, the right passive roll is nearer to the rolled ring, which play a role to guide the ring's motion and stabilize the rolling process.

3) Design for Rolling Process

According to the above design method, manufacture the ring blank and rolling gap (The rolling gap is made up of main roll 1, mandrel 2, left passive roll 3 and right passive roll 4). Then install the rolls in the rolling equipment. Afterwards, put the heated ring blank on the mandrel. Rolling the ring blank to forged ring should experience three stages of surface cross rolling, ring rolling and shaping. During the process, the operator should adjust the position of the passive rolls and control the feed speed of the main roll. In the first stage, adjust the passive rolls to the symmetrically arranged position, and make the ring blank into the rolling gap composed by the main roll and two passive rolls. Control the main roll move downward with slow feed speed, which make the ring blank produce surface cross rolling deformation. Thus remove thickness-difference and ovality and form out the surface profile. In the second stage, when the ring surface profile completely fills the rolling gap, adjust the passive rolls to the asymmetrically arranged position, and make the ring blank into the rolling gap composed by the main roll and mandrel. Control the main roll move downward with fast feed speed, which make the ring blank produce ring rolling deformation. Thus reduce the thickness and enlarge the diameter of the rolled ring. In the third stage, when the ring out surface is close to contact the working surface of the left passive roll, control the main roll move downward with slower feed speed, which can precisely shape the dimension of the rolled ring. Thus remove the thickness-difference and decrease the deformation rate of rolled ring. While the ring out surface completely contacts the working surface of the left passive roll, stop the downward feed motion of the main roll and move it upward. Thus, the rolling process is over.

The feed speed of the main roll in the three stages can be designed as following:

In the first stage (i.e. surface cross rolling stage), set it as slow feed speed $$v_1 = (0.1 \sim 0.4) \frac{n_m \beta^2 R_{m2}^2}{30 R_0 (1 + R_{m2}/R_i)^2} \left(1 + \frac{R_{m2}}{R_i} + \frac{R_{m2}}{R_0} - \frac{R_{m2}}{r_0}\right)$$

In the second stage (i.e. ring rolling stage), set it as fast feed speed $v_2 = (1.5 \sim 3) v_1$ In the third stage (i.e. shaping stage), set it as slower feed speed $v_3 = (0.1 \sim 0.5)$ mm/s The benefits for this invention: The proposed combined ring rolling method for spherical valve body consists of the two stages, surface cross rolling and general ring rolling. In surface cross rolling stage, the ring blank is rolled by main roll and two passive rolls, and the profile shapes in the rolling gaps of the three rolls. In the general ring rolling stage, the ring blank is rolled by the main roll and mandrel, and the thickness reduces and diameter expands. This method can reasonably control the metal flow of ring blank during the deformation process: in surface cross rolling stage, the circumferential metal flow is limited by main roll and two passive rolls, and the radial metal flow is promoted to fill in the rolling gap and shape the ring profile, which plays the role of ring blank performing; in general ring rolling stage, the circumferential metal flow is dominant to expand the ring diameter, thus the profile and diameter of ring can be obtained simultaneously after two stages. Comparing to conventional forging, this method has the obvious advantages of low energy consumption, high material utilization and good forming accuracy as its feature of continuous partial rotary forming technology. Comparing to general ring rolling, this method can avoid the performing of ring blank under press machine, which also reduce the energy and time cost. Using this method, the spherical valve body manufacturing with low consumption, high efficiency and low cost can be realized with reasonable technology parameter design and rolling process control.

The advantages of the present invention include:

The proposed combined ring rolling method for spherical valve body consists of the two stages, surface cross rolling and general ring rolling. In surface cross rolling stage, the ring blank is rolled by main roll and two passive rolls, and the profile shapes in the rolling gaps of the three rolls. In the general ring rolling stage, the ring blank is rolled by the main roll and mandrel, and the thickness reduces and diameter expands. This method can reasonably control the metal flow of ring blank during the deformation process: in surface cross rolling stage, the circumferential metal flow is limited by main roll and two passive rolls, and the radial metal flow is promoted to fill in the rolling gap and shape the ring profile, which plays the role of ring blank performing; in general ring rolling stage, the circumferential metal flow is dominant to expand the ring diameter, thus the profile and diameter of ring can be obtained simultaneously after two stages. Comparing to conventional forging, this method has the obvious advantages of low energy consumption, high material utilization and good forming accuracy as its feature of continuous partial rotary forming technology. Comparing to general ring rolling, this method can avoid the performing of ring blank under press machine, which also reduce the energy and time cost. Using this method, the spherical valve body manufacturing with low consumption, high efficiency and low cost can be realized with reasonable technology parameter design and rolling process control.

BRIEF DESCRIPTION OF THE DRAWINGS

The drawings described below are for illustration purpose only. The drawings are not intended to limit the scope of the present teaching in any way.

In FIG. 4: (a) at the beginning stage of surface cross rolling, (b) at the end stage of surface cross rolling, (c) at the beginning stage of ring rolling, (d) at the end stage of ring rolling.

DETAILED DESCRIPTION OF THE PRESENT INVENTION

A list of reference numerals with corresponding components as shown in the drawing is given in the following table only for the purpose of a reader's convenience:

| 1- The main roll | 2- The mandrel |
|---|---|
| 3- The left passive roll | 4- The right passive roll |
| 5- The ring blank | 6- The forged ring |

Design for Ring Blank

The ring blank section is designed to rectangular section. And its size can be designed as following steps:

(1) Determining Ring Blank Volume

Firstly, the forged ring volume V can be calculated as following equation $$V = \pi B R_s^2 - \pi \frac{B^3}{12} - \pi B r^2$$

where $R_s$, B and r are respectively the spherical radius, height and inner radius of the forged ring. And r is the half value of the forged ring inner diameter d.

According to the principle of volume keeping constant during plastic deformation, and considering the metallic oxidation loss during ring blank heating (the loss coefficient α is usually 3%~5%), thus the ring blank volume $V_0$ can be designed as $V_0=(1+\alpha)V$.

(2) Determining Rolling Ratio

The rolling ratio k is the section area ratio of forged ring to ring blank, that is $k=s_0/s$, where $s_0$ is the section area of ring blank and s is the section area of forged ring.

The ring blank section area $s_0$ can be calculated as $s_0=(R_0-r_0)B_0$, where $R_0$, $B_0$ and $r_0$ are respectively the outer radius, height and inner radius of the blank. And $R_0$ is the half value of the ring blank outer diameter $D_0$, $r_0$ is the half value of the ring blank inner diameter $d_0$.

The forged ring section area s can be calculated as $$s = R_s^2 \arcsin\frac{B}{2R_s} - 0.5B\sqrt{R_s^2 - 0.25B^2} + B\left(\sqrt{R_s^2 - 0.25B^2} - r\right)$$

The rolling ratio can reflect the rolling deformation degree and rolling efficiency. In order to make the ring blank produce sufficient deformation to refine microstructure, and considering to enhance rolling efficiency, the valve of k is usually 1.2~3.

(3) Determining Ring Blank Size

Due to adopt closed cavity, the axial deformation is very small. Therefore, the ring blank height is designed equal to the forged ring height, that is $B_0=B$.

According to the ring blank volume, height and rolling ratio, the ring blank inner radius can be designed as $$r_0 = \frac{V_0}{2\pi k s} - \frac{ks}{2B_0}$$

And the ring blank outer radius can be designed as $$R_0 = \frac{V_0}{2\pi k s} + \frac{ks}{2B_0}$$

Design for Rolling Gap

In this invention, the combined ring rolling includes two stages, that is surface cross rolling and general ring rolling. During the surface cross rolling stage, the rolling gap is made up of the working surfaces of main roll and two passive rolls. During the general ring rolling stage, the rolling gap is made up of the working surfaces of main roll and mandrel.

The working surfaces of main roll, mandrel and two passive rolls can be designed as following method:

(1) Working Surface of Main Roll

The working surface of main roll is adopted closed structure. And the main working surface is spherical surface.

The spherical radius of main roll $R_{sm}$ is design as $R_{sm}=R_s$.

The working surface height of main roll $B_m$ is design as $B_m=B+(1\sim 4)$ mm.

To make rolling process stabilization, the linear velocity of main roll $v_m$ is usually (1.0~1.2) m/s. According to the linear velocity of main roll, the maximum working surface radius of main roll can be determined as $$R_{m2} = \frac{v_m}{2\pi n_m}$$

where $n_m$ is the rotational speed of main roll, and it can be calculated by the equation $$n_m = \frac{n}{\eta}$$

where n is rotational speed of motor, η is the transmission ratio.

(Additional remark: η is the transmission ratio of gearbox. For any given gearbox, η is a known value. When gearbox is not given, η can be determined to make sure $v_m$ is in the range of (1.0~1.2) m/s)

The minimum working surface radius of main roll can be determined as $$R_{m1} = R_{m2} - \left(R_{sm} - \sqrt{R_{sm}^2 - \frac{B_m^2}{4}}\right)$$

There is a raised step respectively on the upper and lower working surface of main roll, which constitute the closed rolling gap. In order to prevent the main roll from contacting the mandrel during rolling process, the radial length of the step should smaller than the radial thickness of the upper and lower surface of the forged ring, that is $$L_{mu} < \sqrt{R_s^2 - \frac{B^2}{4}} - r$$

Generally, the radial length of the upper step on main roll $L_{mu}$ is determined as the following formula $$L_{mu} = (0.5 \sim 0.8)\left(\sqrt{R_s^2 - \frac{B^2}{4}} - r + R_0 - r_0\right)$$

The radial length of the lower step on main roll $L_{ml}$ is equal to $L_{mu}$. The axial height of the step on main roll can be determined as the following formula $$B_{mu} = B_{ml} = (0.1 \sim 0.3)B$$

where $B_{mu}$ and $B_{ml}$ are respectively the axial height of the upper and lower step on main roll.

(2) Working Surface of Mandrel

The axial working surface height of mandrel $B_i$ can be determined as the following formula $$B_i = B + (20 \sim 80) \text{ mm}$$

To satisfy the critical condition of biting into rolling gap and plastic penetrating deformation zone, the working surface radius of mandrel should satisfy the following formula $$R_i \geq \frac{R_{m1}(R_0 - r_0)}{17.5\beta R_{m1} - (R_0 - r_0)}$$

where the frictional angle $\beta = \arctan \mu$, $\mu$ is the friction coefficient.

(Additional remark: $\mu$ is the friction coefficient, and its valve can be obtained by friction coefficient test or reference. For steel, the hot friction coefficient is about 0.35.)

Considering the mandrel passing through the ring blank inner hole, the working surface radius of mandrel should also satisfy the following formula $$R_i \leq r_0 - 10$$

During putting the ring blank in, taking the forged ring out and rolling process, the center distance of the main roll to the mandrel should in the limited closed center distance range of the equipment. Therefore, the size of the main roll and mandrel should also satisfy the formulas $$R_{m1} + R_{sm} - \sqrt{R_{sm}^2 - \frac{B_m^2}{4}} + L_{mu} + R_i + H_{max} < S_{max}$$

$$R_{m1} + R_{sm} - r + R_i > S_{min}$$

where $H_{max}$ is the bigger one between the ring blank maximum thickness and the forged ring maximum thickness. $S_{max}$ is the maximum closed center distance of the equipment and $S_{min}$ is the minimum closed center distance of the equipment.

(Additional remark: if $H_{bmax}$ is the maximum thickness of the ring blank and $H_{rmax}$ is the maximum thickness of the forged ring, $H_{max}$ is the bigger one between $H_{bmax}$ and $H_{rmax}$.

(3) Working Surface of Passive Roll

The structure of passive roll is similar to the main roll, the working surface of the passive roll is also spherical surface.

The spherical radius of passive roll $R_{sc}$ is design as $R_{sc} = R_s$.

The working surface height of passive roll $B_c$ is design as $B_c = B_m + (1 \sim 4)$ mm The minimum working surface radius of passive $R_{c1}$ roll can be determined as $R_{c1} = (0.3 \sim 0.7) R_{m1}$.

For the characteristic of small thickness on the upper and lower region to this ring part, to effectively prevent the ring from producing axial spread, the axial height of the passive roll cavity is larger than the main roll. Generally, the radial length of the upper step $L_{cu}$ and the lower step $L_{cl}$ on the passive roll can be determined by $L_{cu} = L_{cl} = (1.5 \sim 3) L_{mu}$. The axial height of the upper step $B_{cu}$ and the lower step $B_{cl}$ on the passive roll can be determined by $B_{cu} = B_{cl} = (0.1 \sim 0.3)B$.

The two passive rolls are respectively arranged on the left and right sides below the mandrel. $\theta_1$ is the angel between the vertical and the line of the center points of left passive roll to the mandrel, and $\theta_2$ is the angel between the vertical and the line of the center points of right passive roll to the mandrel. Generally, their valve are in the range of 50°~70°. For the deformation characteristic of different stages, the arranged angels of the left and right passive rolls are usually different during rolling process. During the surface cross rolling stage, the two passive rolls are symmetrically arranged on the left and right sides of the mandrel. The values of $\theta_1$ and $\theta_2$ are both about 60°, which is good for force balance and stable rolling. During the general ring rolling stage, the arranged angel of the right passive roll $\theta_2$ is slightly larger than the left passive roll $\theta_1$. The value of $\theta_2$ is about 65°~70°, and the value of $\theta_1$ is 50°~55°. Thus, the right passive roll is nearer to the rolled ring, which play a role to guide the ring's motion and stabilize the rolling process.

Design for Rolling Process

According to the above design method, manufacture the ring blank and rolling gap (The rolling gap is made up of main roll 1, mandrel 2, left passive roll 3 and right passive roll 4). Then install the rolls in the rolling equipment. Afterwards, put the heated ring blank on the mandrel. Rolling the ring blank to forged ring should experience three stages of surface cross rolling, ring rolling and shaping. During the process, the operator should adjust the position of the passive rolls and control the feed speed of the main roll. In the first stage, adjust the passive rolls to the symmetrically arranged position, and make the ring blank into the rolling gap composed by the main roll and two passive rolls. Control the main roll move downward with slow feed speed, which make the ring blank produce surface cross rolling deformation. Thus remove thickness-difference and ovality and form out the surface profile. In the second stage, when the ring surface profile completely fills the rolling gap, adjust the passive rolls to the asymmetrically arranged position, and make the ring blank into the rolling gap composed by the main roll and mandrel. Control the main roll move downward with fast feed speed, which make the ring blank produce ring rolling deformation. Thus reduce the thickness and enlarge the diameter of the rolled ring. In the third stage, when the ring out surface is close to contact the working surface of the left passive roll, control the main roll move downward with slower feed speed, which can precisely shape the dimension of the rolled ring. Thus remove the thickness-difference and decrease the deformation rate of rolled ring. While the ring out surface completely contacts the working surface of the left passive roll, stop the downward feed motion of the main roll and move it upward. Thus, the rolling process is over.

The feed speed of the main roll in the three stages can be designed as following:

In the first stage (i.e. surface cross rolling stage), set it as slow feed speed $$v_1 = (0.1 \sim 0.4)\frac{n_m \beta^2 R_{m2}^2}{30R_0(1+R_{m2}/R_i)^2}\left(1+\frac{R_{m2}}{R_i}+\frac{R_{m2}}{R_0}-\frac{R_{m2}}{r_0}\right)$$

In the second stage (i.e. ring rolling stage), set it as fast feed speed $$v_2 = (1.5 \sim 3)v_1$$

In the third stage (i.e. shaping stage), set it as slower feed speed $$v_3 = (0.1 \sim 0.5) \text{mm/s}$$

Example

Figure 1:
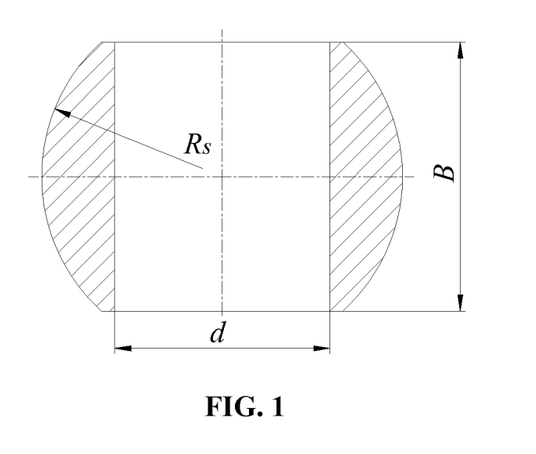
FIG. 1 is the section view of forged ring for the spherical valve body in the present invention.
Figure 2:
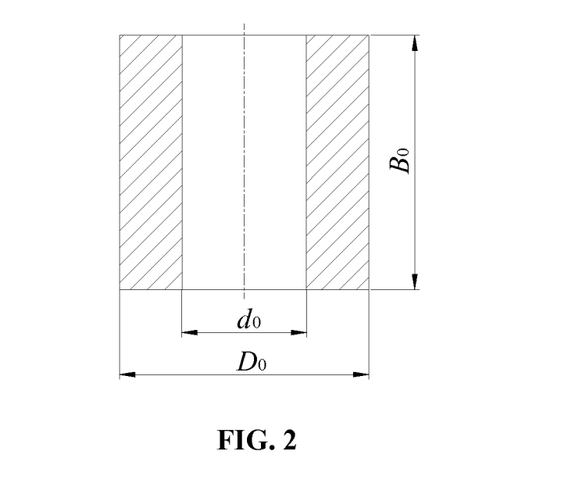
FIG. 2 is the section view of ring blank for the spherical valve body in present invention.

Take the spherical valve body used in petroleum pipeline equipment shown in FIG. 1 as an example. The spherical radius $R_s$, height B and inner radius r of the forged ring are respectively 460 mm, 265 mm and 680 mm. The combined ring rolling technology of this ring part includes following contents:

(1) Design for Ring Blank (the Related Parameters can be Obtained According to the Above Formulas)

The loss coefficient α is selected as 4%, and the volume of the ring blank can be calculated to 228486861 mm³. The blank height $B_0 = B = 680$ mm. The rolling ratio k is selected as 1.53, and the inner radius $r_0$ of the ring blank can be calculated to 121 mm, the outer radius $R_0$ is 348.7 mm.

According to the dimension of ring blank, select appropriate ingot (the material is Q345 steel) and cut to required size. Then heat the ring blank form room temperature to hot deformation temperature (i.e. 1150~1250°) with high plasticity and low deformation resistance. Afterward, forge the heated ingot to the designed ring blank under a press machine.

(2) Design for Rolling Gap
1) Working Surface of Main Roll

Figure 3A:
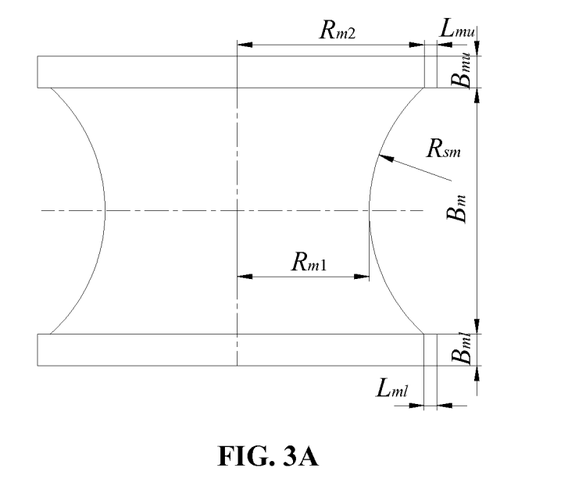
FIG. 3A is the structure diagram of working surface of the main roll in present invention.

The working surface structure of the main roll is designed as shown in FIG. 3A. The spherical radius $R_{sm}$, minimum working surface radius $R_{m1}$ and working surface height $B_m$ are respectively 460 mm, 350 mm and 683 mm. The radial length of the upper and lower steps $L_{mu}$ and $L_{ml}$ are both 35 mm. The axial height of the upper and lower steps $B_{mu}$ and $B_{ml}$ are both 50 mm.

2) Working Surface of Mandrel

Figure 3B:
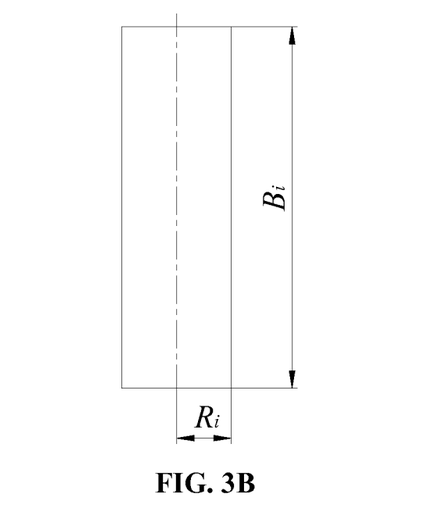
FIG. 3B is the structure diagram of working surface of the mandrel in present invention.

The working surface structure of the mandrel is designed as shown in FIG. 3B. The working surface radius of the mandrel $R_i$ is 110 mm, and the axial working surface height $B_i$ is 750 mm.

3) Working Surface of Passive Roll

Figure 3C:
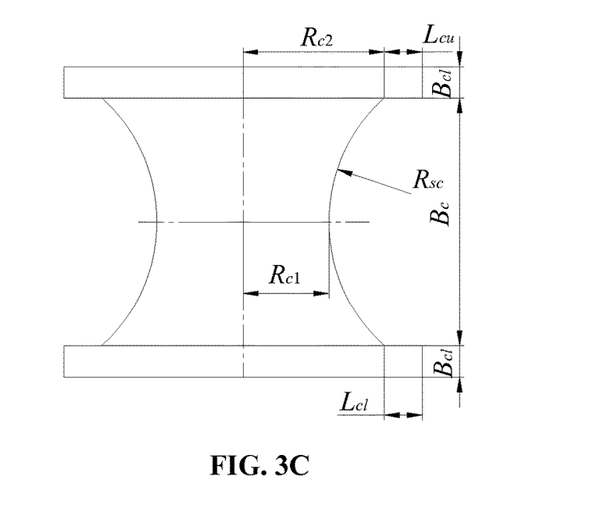
FIG. 3C is the structure diagram of working surface of the passive roll in present invention.

The working surface structure of the passive roll is designed as shown in FIG. 3C. The spherical radius $R_{sc}$, minimum working surface radius $R_{c1}$ and working surface height $B_c$ are respectively 460 mm, 225 mm and 686 mm. The radial length of the upper and lower steps $L_{cu}$ and $L_{cl}$ are both 70 mm. The axial height of the upper and lower steps $B_{cu}$ and $B_{cl}$ are both 50 mm.

(3) Design for Rolling Process

Figure 4:
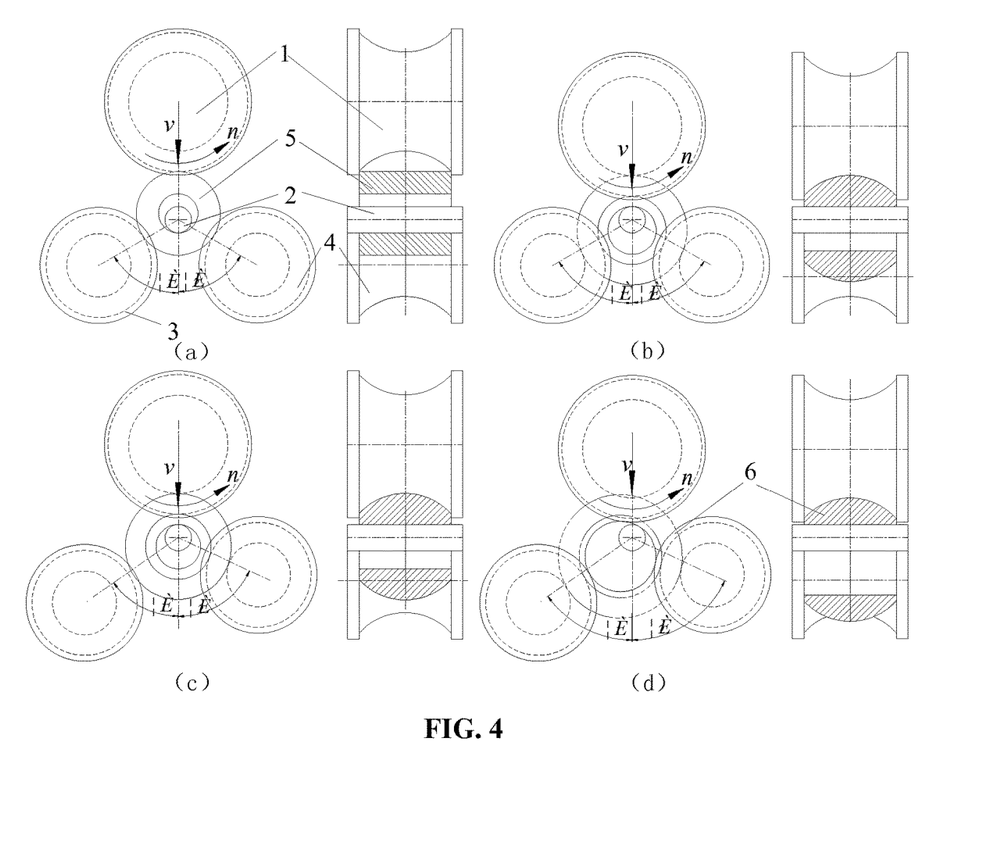
FIG. 4 is the forming process diagram of combined ring rolling in present invention.

As shown in FIG. 4, install the manufactured rolls in the rolling equipment. Then, put the heated ring blank on the mandrel. Adjust the passive rolls to the symmetrically arranged position, and set $\theta_1$ and $\theta_2$ to both 60°, making the ring blank into the rolling gap composed by the main roll and two passive rolls. Control the main roll move downward with 1.5 mm/s, making the ring blank produce surface cross rolling deformation. When the ring surface profile completely fills the rolling gap, adjust the passive rolls to the asymmetrically arranged position, set $\theta_1$ to 55° and $\theta_2$ to 65°, making the ring blank into the rolling gap composed by the main roll and mandrel. Control the main roll move downward with 2.5 mm/s, making the ring blank produce ring rolling deformation. When the ring out surface is close to contact the working surface of the left passive roll, control the main roll move downward with 0.3 mm/s, precisely shaping the dimension of the rolled ring. While the ring out surface completely contacts the working surface of the left passive roll, stop the downward feed motion of the main roll, move the main roll and passive rolls to the initial position, and take the forged ring out.

According to the statistical, the present technique can increase the material utilization by 25% and improving working efficiency by 5 times and decrease the production cost by 20%, compared with the conventional forming technique.

The design of combined ring rolling for any spherical valve body with other material and size is similar to the above example. The forming result is also similar. So examples are not given one by one in this description.

What is claimed is:
1. A combined ring rolling method for manufacturing a spherical valve body, comprising the following steps:
1) designing a ring blank by providing a ring blank section as a rectangular section having a size designed as following steps:
    i) determining a volume $V_0$ of the ring blank, wherein a forged ring volume V is calculated using the following equation

$$V = \pi B R^2 - \pi \frac{B^4}{12} - \pi B r^2,$$

wherein R, B and r are respectively spherical radius, height and inner radius of the forged ring, and r is an half value of the forged ring inner diameter d; wherein a oxidation loss coefficient α is in a range of 3% to 5%; and wherein the ring blank volume $V_0$ is designed as $V_0 = (1+\alpha)V$;
    ii) determining a rolling ratio by providing a rolling ratio $k = s_0/s$, wherein $s_0$ is a section area of the ring blank and s is a section area of the forged ring; wherein the ring blank section area $s_0$ is calculated as $s_0 = (R_0 - r_0)B_0$, wherein $R_0$, $B_0$ and $r_0$ are respectively outer radius, height and inner radius of the ring blank, and $R_0$ is an half value of the ring blank outer diameter $D_0$, $r_0$ is an half value of the ring blank inner diameter $d_0$; wherein the forged ring section area s is calculated as $$s = R^2 \arcsin\frac{B}{2R} - 0.5B\sqrt{R^2 - 0.25B^2} + B\left(\sqrt{R^2 - 0.25B^2} - r\right);$$

wherein a valve of k is in a range of 1.2 to 3; and
iii) determining the ring blank size, wherein the ring blank height $B_0=B$; wherein the ring blank inner radius $r_0$ can be is designed as $$r_0 = \frac{V_0}{2\pi ks} - \frac{ks}{2B_0};$$

and
wherein the ring blank outer radius $R_0$ can be is designed as $$R_0 = \frac{V_0}{2\pi ks} + \frac{ks}{2B_0};$$

2) designing a rolling gap by a combined ring rolling process including two stages of surface cross rolling and general ring rolling; wherein during the surface cross rolling stage, the rolling gap is made up of working surfaces of a main roll and two passive rolls; wherein during the general ring rolling stage, the rolling gap is made up of working surfaces of the main roll and a mandrel; wherein the working surfaces of the main roll, the mandrel, and the two passive rolls are respectively designed as follows:
I) determining the working surface of the main roll, wherein the main roll is adopted as a closed structure, and the working surface of the main roll is designed as a spherical surface; wherein a spherical radius of the main roll $R_m=R$; wherein a height of the working surface of the main roll $B_m=B+\zeta_1$ mm, wherein a valve of $\zeta_1$ is in a range of 1 to 4; wherein a linear velocity of the main roll $v_m$ is designed in a range of 1.0 to 1.2 m/s; wherein a maximum radius of the working surface of the main roll is determined as $$R_{m2} = \frac{v_m}{2\pi n_m},$$

wherein $n_m$ is a rotational speed of the main roll, and is calculated by an equation of $$n_m = \frac{n}{\eta},$$

wherein n is a rotational speed of a motor, $\eta$ is a transmission ratio of the motor; wherein a minimum radius of the working surface of the main roll is determined as $$R_{m1} = R_{m2} - \left(R_m - \sqrt{R_m^2 - \frac{B_m^2}{4}}\right);$$

wherein a raised step is respectively designed on upper and lower working surface of the main roll, so as to constitute a closed rolling gap; wherein a radial length of the upper step is smaller than a radial thickness defined between an upper end surface and a lower end surface of the forged ring, which satisfies a formula of $$L_{mu} < \sqrt{R^2 - \frac{B^2}{4}} - r;$$

wherein the radial length of the upper step on the main roll $L_{mu}$ is determined as the following formula:

$$L_{mu} = \zeta_2 \left(\sqrt{R^2 - \frac{B^2}{4}} - r + R_0 - r_0\right);$$

wherein a value of $\zeta_2$ is in a range of 0.5 to 0.8, wherein a radial length of the lower step on the main roll $L_{ml}=L_{mu}$; wherein an axial height of each step on the main roll $B_{mu}=B_{ml}=\zeta_3 B$, wherein a value of $\zeta_3$ is in a range of 0.1 to 0.3, wherein where $B_{mu}$ and $B_{ml}$ are respectively the axial heights of the upper and lower steps on the main roll;
II) determining the working surface of the mandrel, wherein an axial height of the working surface of the mandrel $B_i=B+\zeta_4$ mm, wherein a value of $\zeta_4$ is in a range of 20 to 80; wherein a radius of the working surface of the mandrel satisfies $$R_i \geq \frac{R_{m1}(R_0 - r_0)}{17.5\beta R_{m1} - (R_0 - r_0)},$$

wherein a frictional angle $\beta=\arctan\mu$, $\mu$ is a friction coefficient; wherein the radius of the working surface of the mandrel further satisfies $$R_i \leq r_0 - 10;$$

III) determining the working surface of each passive roll, wherein a spherical radius of a passive roll $R_c=R$; wherein a height of the working surface of the passive roll $B_c=B_m+\zeta_5$ mm; wherein a value of $\zeta_5$ is in a range of 1 to 4; wherein a minimum radius of the working surface radius of the passive roll $R_{cl}=\zeta_6 R_{ml}$; wherein a value of $\zeta_6$ is in a range of 0.3 to 0.7; wherein a radial length $L_{cu}$ of an upper step and a radial length $L_{cl}$ of a lower step $L_{cl}$ on the passive roll are determined by $L_{cu}=L_{cl}=\zeta_7 L_{mu}$; wherein a value of $\zeta_7$ is in a range of 1.5 to 3; wherein an axial height $B_{cu}$ of the upper step and a radial height $B_{cl}$ of the lower step on the passive roll are determined by $B_{cu}=B_{cl}=\zeta_8 B$; wherein a value of $\zeta_8$ is in a range of 0.1 to 0.3; wherein the two passive rolls are respectively arranged on the left and right sides below the mandrel; wherein $\theta_1$ is an angle defined between a vertical line and a line connecting a center point of the left passive roll and a center point of the mandrel, and $\theta_2$ is an angle defined between a vertical line and a line connecting a center point of the right passive roll and the center point of the mandrel; wherein valves of $\theta_1$ and $\theta_2$ are in a range of 50° to 70°; wherein during the surface cross rolling stage, the two passive rolls are symmetrically arranged on the left and right sides of the mandrel, wherein $\theta_1$ and $\theta_2$ are both about 60°; and wherein during the general ring rolling stage, the arranged angle $\theta_2$ of the right passive roll is larger than the arranged angle $\theta_1$ of the left passive roll, wherein $\theta_2$ is in a range of 65° to 70°, and $\theta_1$ is in a range of 50° to 55°; and 3) manufacturing the ring blank and the rolling gap according to the above design of 1) and 2), installing rolls in rolling equipment, disposing the ring blank on the mandrel; and rolling the ring blank to the forged ring, wherein the rolling process comprises three stages of surface cross rolling, ring rolling and shaping; wherein during the rolling process, a position of the passive rolls is adjusted and a feed speed of the main roll is controlled, by a operator;

in the first stage of surface cross rolling, adjusting the passive rolls to the symmetrically arranged position, and placing the ring blank into the rolling gap composed by the main roll and two passive rolls, controlling the main roll to move downward with a first feed speed, which make the ring blank produce a surface cross rolling deformation;

in the second stage of ring rolling, when the ring surface profile completely fills the rolling gap, adjusting the passive rolls to the asymmetrically arranged position, and placing the ring blank into the rolling gap composed by the main roll and mandrel, controlling the main roll to move downward with a second feed speed that is faster than the first feed speed, which make the ring blank produce a ring rolling deformation; and in the third stage of shaping, when the ring out surface is close to contact the working surface of the left passive roll, controlling the main roll to move downward with a third feed speed that is slower than the first feed speed, precisely shaping the forged ring, while the ring out surface completely contacts the working surface of the left passive roll, stopping the downward feed motion of the main roll and moving the main roll upward, and ending the rolling process.

2. The combined ring rolling method for manufacturing the spherical valve body according to claim 1, in the first stage (of surface cross rolling), the first feed speed of the main roll is determined as $$v_1 = \zeta_9 \frac{n_m \beta^2 R_{m2}^2}{30 R_0 (1 + R_{m2}/R_i)^2} \left(1 + \frac{R_{m2}}{R_i} + \frac{R_{m2}}{R_0} + \frac{R_{m2}}{r_0}\right);$$

wherein a value of $\zeta_9$ is in a range of 0.1 to 0.4;

wherein in the second stage (of ring rolling-), the second feed speed of the main roll is determined as $$v_2 = \zeta_{10} v_1;$$

wherein a value of $\zeta_{10}$ is in a range of 1.5 to 3; and wherein in the third stage (of shaping), the third feed speed of the main roll is in a range of 0.1 to 0.5 mm/s.

3. The combined ring rolling method for manufacturing the spherical valve body according to claim 1, wherein the size of the main roll and the size of the mandrel satisfy the following formulas:

$$R_{m1} + R_m - \sqrt{R_m^2 - \frac{B_m^2}{4}} + L_{mu} + R_i + H_{max} < S_{max},$$

$$R_{m1} + R_m - r + R_i > S_{min},$$

wherein $H_{max}$ is the maximum one of the ring blank maximum thickness and the forged ring maximum thickness, $S_{max}$ is a maximum closed center distance and $S_{min}$ is a minimum closed center distance of the rolling equipment.

* * * * *